(12) United States Patent
Liu et al.

(10) Patent No.: US 12,081,409 B2
(45) Date of Patent: Sep. 3, 2024

(54) DATA ANALYSIS METHOD, ELECTRONIC DEVICE AND STORAGE MEDIUM

(71) Applicant: ZTE CORPORATION, Shenzhen (CN)

(72) Inventors: Jianwei Liu, Shenzhen (CN); Jing Han, Shenzhen (CN); Xinyou Dong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/003,546

(22) PCT Filed: Mar. 30, 2021

(86) PCT No.: PCT/CN2021/084181
§ 371 (c)(1),
(2) Date: Dec. 28, 2022

(87) PCT Pub. No.: WO2022/001257
PCT Pub. Date: Jan. 6, 2022

(65) Prior Publication Data
US 2023/0261947 A1 Aug. 17, 2023

(30) Foreign Application Priority Data
Jun. 28, 2020 (CN) .......................... 202010600125.3

(51) Int. Cl.
*H04L 41/142* (2022.01)
(52) U.S. Cl.
CPC ................................ *H04L 41/142* (2013.01)
(58) Field of Classification Search
CPC ....... H04L 43/12; H04L 41/142; H04L 41/22; H04L 43/06
See application file for complete search history.

(56) References Cited

U.S. PATENT DOCUMENTS

2004/0138858 A1* 7/2004 Carley .................... H04L 43/12
702/186
2013/0322265 A1* 12/2013 Kozisek .............. H04L 43/0894
370/251

(Continued)

FOREIGN PATENT DOCUMENTS

| CN | 105975389 A | 9/2016 |
| CN | 107276849 A | 10/2017 |

(Continued)

OTHER PUBLICATIONS

Greenland, S., Senn, S.J., Rothman, K.J et al. Statistical tests, P values, confidence intervals, and power: a guide to misinterpretations. Eur J Epidemiol 31, 337-350 (2016). https://doi.org/10.1007/s10654-016-0149-3 (Year: 2016).*

(Continued)

*Primary Examiner* — Chirag R Patel
(74) *Attorney, Agent, or Firm* — HAUPTMAN HAM, LLP

(57) ABSTRACT

Embodiments of the present application relate to the technical field of communications, and provide a data analysis method, including: obtaining network performance index data before a network is updated as a first data, and obtaining network performance index data after the network is updated as a second data; and outputting a network performance analysis result after the network is updated according to a data volatility of the second data relative to the first data. Embodiments of the present application further provide an electronic device and a storage medium.

6 Claims, 5 Drawing Sheets

(56) References Cited

U.S. PATENT DOCUMENTS

| | | | |
|---|---|---|---|
| 2017/0070396 A1 | 3/2017 | Flanagan et al. | |
| 2019/0068443 A1* | 2/2019 | Li et al. | |
| 2019/0236306 A1* | 8/2019 | Ding | H04L 41/142 |
| 2021/0352534 A1* | 11/2021 | Tiwari | H04L 41/5009 |
| 2022/0400060 A1* | 12/2022 | Sethi | H04L 43/0817 |

FOREIGN PATENT DOCUMENTS

| | | |
|---|---|---|
| CN | 108509345 A | 9/2018 |
| JP | 5876542 B1 | 3/2016 |
| JP | 2020-039099 A | 3/2020 |

OTHER PUBLICATIONS

International Search Report and Written Opinion issued in International Patent Application No. PCT/CN2021/084181; mailed Jun. 17, 2021; 11 pgs.
First Office Action issued in corresponding Japanese Patent Application No. 2022-581315; mailed Sep. 20, 2023; 4 pages.

* cited by examiner

DATA ANALYSIS METHOD, ELECTRONIC DEVICE AND STORAGE MEDIUM

CROSS-REFERENCE TO RELATED APPLICATIONS

This application is the National Stage of International Application No. PCT/CN2021/084181, filed on Mar. 30, 2021, which claims priority to Chinese Patent Application 202010600125.3, filed on Jun. 28, 2020, the entire contents of which are incorporated herein by reference.

TECHNICAL FIELD

The present application relates to the technical field of communications, and in particular to a data analysis method, an electronic device and a storage medium.

BACKGROUND

In order to meet the communication needs of daily life, commerce and public services, or the like, the communication network needs to ensure continuous and stable operation. However, in order to improve network performance or user experience, the communication network system needs to perform some major operations, such as frequently modify network parameters and upgrade versions. These major operations may bring instability to the communication network, and it is necessary to evaluate the network performance before and after the operation to determine whether the major operations are appropriate. If the major operations are not appropriate, a fallback is required to ensure the stable operation of the communication network.

At present, in order to evaluate the network performance before and after the major operation, network operation and maintenance personnel design multiple network performance index data, and evaluate the effect of the major operation according to the changes of each network performance index data before and after the operation.

However, the traditional method usually requires network operation and maintenance personnel to manually compare the changes of multiple network performance indexes before and after the operation, which requires a lot of labor costs, and the evaluation efficiency is low.

SUMMARY

The purpose of the embodiments of the present application is to provide a data analysis method, an electronic device, and a storage medium, so as to improve the efficiency of network performance evaluation and reduce labor costs.

In order to solve the above technical problems, embodiments of the present application provide a data analysis method, including: obtaining network performance index data before a network is updated as a first data, and obtaining network performance index data after the network is updated as a second data; and outputting a network performance analysis result after the network is updated according to a data volatility of the second data relative to the first data.

Embodiments of the present application further provide an electronic device, including: at least one processor; and a memory communicated with the at least one processor, the memory stores instructions executable by the at least one processor, and the instructions are executed by the at least one processor, to cause the at least one processor to execute the data analysis method described above.

Embodiments of the present application further provide a computer-readable storage medium storing a computer program, and when the computer program is executed by a processor, the data analysis method as described above is implemented.

BRIEF DESCRIPTION OF THE DRAWINGS

One or more embodiments are exemplified by pictures in the accompanying drawings, and these exemplifications are not intended to limit the embodiments.

DETAILED DESCRIPTION OF THE EMBODIMENTS

In order to make the objectives, technical solutions and advantages of the embodiments of the present application clearer, each embodiment of the present application will be described in detail below with reference to the accompanying drawings. However, those of ordinary skill in the art can understand that, in each embodiment of the present application, many technical details are provided for the reader to better understand the present application. However, even without these technical details and various changes and modifications based on the following embodiments, the technical solutions claimed in the present application can be realized. The following divisions of the various embodiments are for the convenience of description, and should not constitute any limitation on the specific implementation of the present application, and the various embodiments may be combined with each other and referred to each other on the premise of not contradicting each other.

A first embodiment of the present application relates to a data analysis method, including: obtaining network performance index data before a network is updated as a first data, and obtaining network performance index data after the network is updated as a second data; and outputting a network performance analysis result after the network is updated according to a data volatility of the second data relative to the first data. According to the data volatility of the network performance index after the network update relative to the data volatility before the network update, the effect of the network update is analyzed. Outputting the network performance analysis results after the network update does not require manual comparison by network operation and maintenance personnel, thereby reducing labor costs and improving the efficiency of network update evaluation.

It should be noted that the execution subject of the data analysis method provided in the embodiment of the present application is a server-side. The server-side can be implemented by a single server or a server cluster composed of multiple servers, and the following uses the server-side as an example for illustration.

Figure 1:
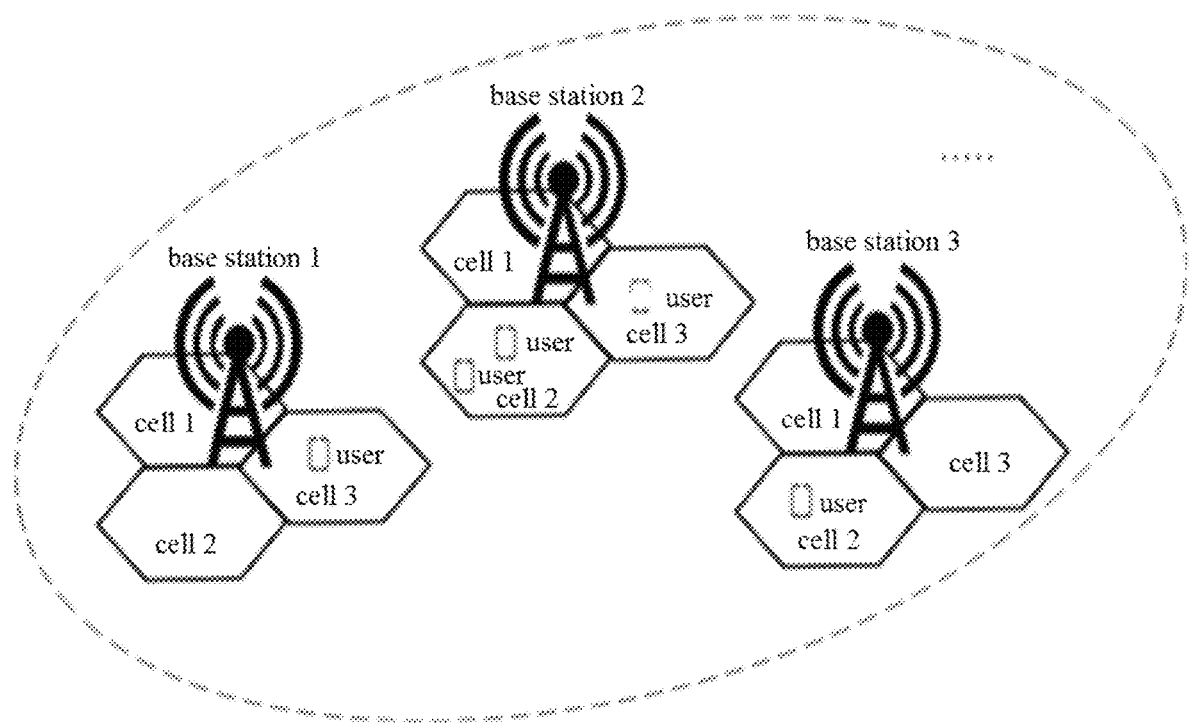
FIG. 1 is an example diagram of an application scenario of a data analysis method according to a first embodiment of the present application.

As shown in FIG. 1, FIG. 1 is an optional application scenario of the data analysis method according to an embodiment of the present application, that is, which is applied in an LTE network environment. The LTE network will involve major operations such as modification of network parameters and version upgrades. For example, when opening a new network base in an LTE network, it is necessary to frequently adjust parameters or perform version upgrades according to the network operating state. Therefore, in order to ensure the stable operation of the network, it is necessary to evaluate the effect of the LTE network after the network update, so as to decide whether to keep the state of the network update or perform a fallback. It can be understood that the embodiments of the present application may also be applied in other network environments such as 5G networks.

Figure 2:
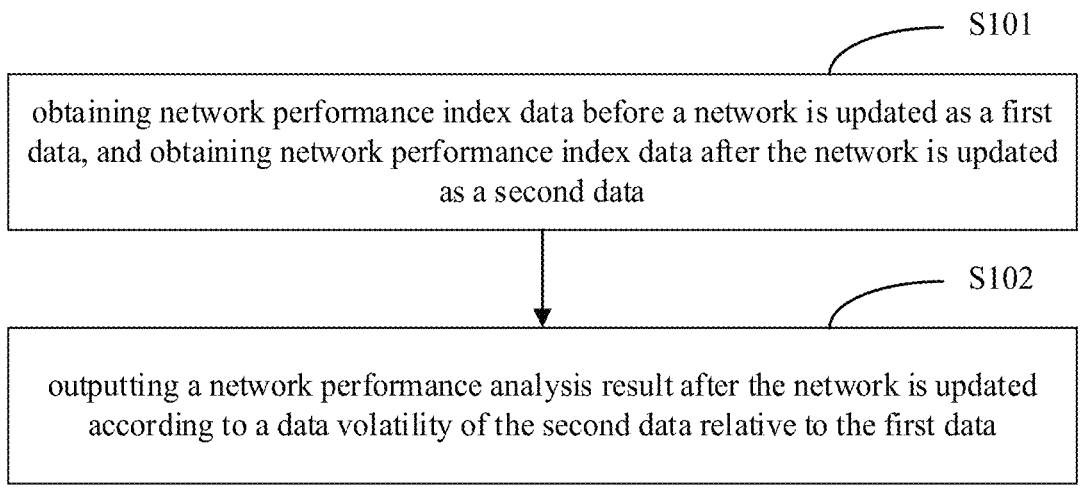
FIG. 2 is a schematic flowchart of a data analysis method according to a first embodiment of the present application.

The specific flow of the data analysis method provided in the embodiment of the present application is shown in FIG. 2, which specifically includes the following operations.

S101, obtaining network performance index data before a network is updated as a first data, and obtaining network performance index data after the network is updated as a second data.

The network performance index data may include key performance index (KPI) data or general performance index data, such as RRC call drop rate, RRC connection establishment success rate, uplink and downlink average traffic and other performance index data that can reflect the network operation state, which can be selected according to actual needs, and are not specifically limited in this embodiment of the present application.

When obtaining the first data, part or all of the network performance index data before the network update may be obtained as the first data. Likewise, when obtaining the second data, part or all of the network performance index data after the network update may be obtained as the second data. It can be understood that the data volume of the first data and the data volume of the second data may be the same or different, for example, the first data is data of 5 days, and the second data is data of 3 days. In order to make the first data and the second data more comparable, the first data and the second data may have the same amount of data. For example, if the first data is data of 5 days, the second data is also data of 5 days. In this embodiment, since the network operation state on weekdays may be different from that on weekends, in order to make the data of the first data and the second data more comparable, the first data and the second data can correspond to the specific days of weekdays and weekends. For example, if the first data is the data of the five days from Monday to Friday, then the second data is also the data from Monday to Friday. Similarly, the first data and the second data can also be more corresponding in time point. For example, if the first data is the data from 0:00 am to 7:00 am, the second data is also the data from 0:00 am to 7:00 am.

In practical applications, the selection of the first data and the second data usually faces two situations. The first situation is the quick evaluation after the network update. For example, the evaluation of the network update is completed within one day after the network is updated, and the operation and maintenance personnel need to know the evaluation results of the network update as soon as possible. The second situation is the stability assessment after a long period of network update, that is, no abnormalities are found in the short term after the network update, but the long-term stability effect still needs to be evaluated by operation and maintenance personnel. For the first situation, since the network performance index data after the network update is less, the amount of data that can be selected for the second data is small, so the network performance index data with finer time granularity can be selected, such as 15-minute sampling data. However, there are many network performance index data before the network update, and the first data selects more data. While the selection time granularity is the same as that of the second data, the average value of the data at a certain time point in multiple days can be used as one of the data. For example, if the first data is the data at 8:00 am on Monday, the second data may be the average value of the data at 8:00 am on Monday. For the second situation, since there are many network performance index data before and after the network update, in order to make the first data and the second data more representative, data with a larger time span can be selected. For example, both the first data and the second data use the average value of multiple data at 8 o'clock in the morning on Mondays as one of the data.

Since the network performance index data may be missing or have other defects, the first data and the second data may be preprocessed accordingly, and the preprocessing may include filling missing values, smoothing filtering, or the like. For example, for data sampling moments with missing values, filling missing values can be filled with the sampling values at the previous moment, and the smoothing filter can be to use the median value of the data instead of the sampling value exceeding the data mean plus/minus 3 times the standard deviation. The preprocessing can also adopt other methods, and the processing method can also be other methods. How to perform the preprocessing can be set according to actual needs, which is not limited herein.

S102, outputting a network performance analysis result after the network is updated according to a data volatility of the second data relative to the first data.

In an embodiment, when analyzing the data volatility of the second data relative to the first data, algorithms such as data mining or machine learning can be used. The specific algorithm used can be set or selected according to actual needs, which is not limited herein, as long as the data volatility of the second data relative to the first data can be compared. In addition, data volatility can be measured by standard deviation, or by other methods or standards.

It can be understood that since the network performance changes greatly when the data fluctuates greatly, it is necessary to pay attention to the situation that the data fluctuation (including increase or decrease) of the second data is greater than that of the first data. When outputting the network performance analysis results after the network update according to the data volatility of the second data relative to the first data, a data fluctuation range can be set. When the data fluctuation of the second data relative to the first data exceeds the range of the fluctuation, the corresponding network performance index and data fluctuation prompt data are output as the network performance analysis result after the network update. The second data may be sorted according to the data volatility, and the sorted second data is output as the network performance analysis result after the network update. The network performance analysis result after the network update may also be in other forms or in other aspects, which is not specifically limited in this embodiment of the present application.

Embodiments of the present application provide a data analysis method, including: obtaining network performance index data before a network is updated as a first data, and obtaining network performance index data after the network is updated as a second data; and outputting a network performance analysis result after the network is updated according to a data volatility of the second data relative to the first data. Since data volatility can effectively reflect changes in network performance after network update, the data volatility is automatically calculated through the data before and after the network update, and the analysis results of the network performance after the network update are output according to the data volatility, which can effectively evaluate the effect of the network update, and does not require network operation and maintenance personnel to perform manual comparative analysis, thereby reducing labor costs and improving the efficiency of network update evaluation.

A second embodiment of the present application relates to a data analysis method. The second embodiment is substantially the same as the first embodiment, the main difference is as follows. In this embodiment, the outputting the network performance analysis result after the network is updated according to the data volatility of the second data relative to the first data includes: calculating a deviation rate of the second data relative to the first data; and outputting a network performance index whose deviation rate is greater than a first preset threshold. Since the deviation rate can effectively reflect the data fluctuation of the second data relative to the first data, by calculating the deviation rate of the second data relative to the first data, the network performance after the network update can be effectively analyzed and evaluated.

Figure 3:
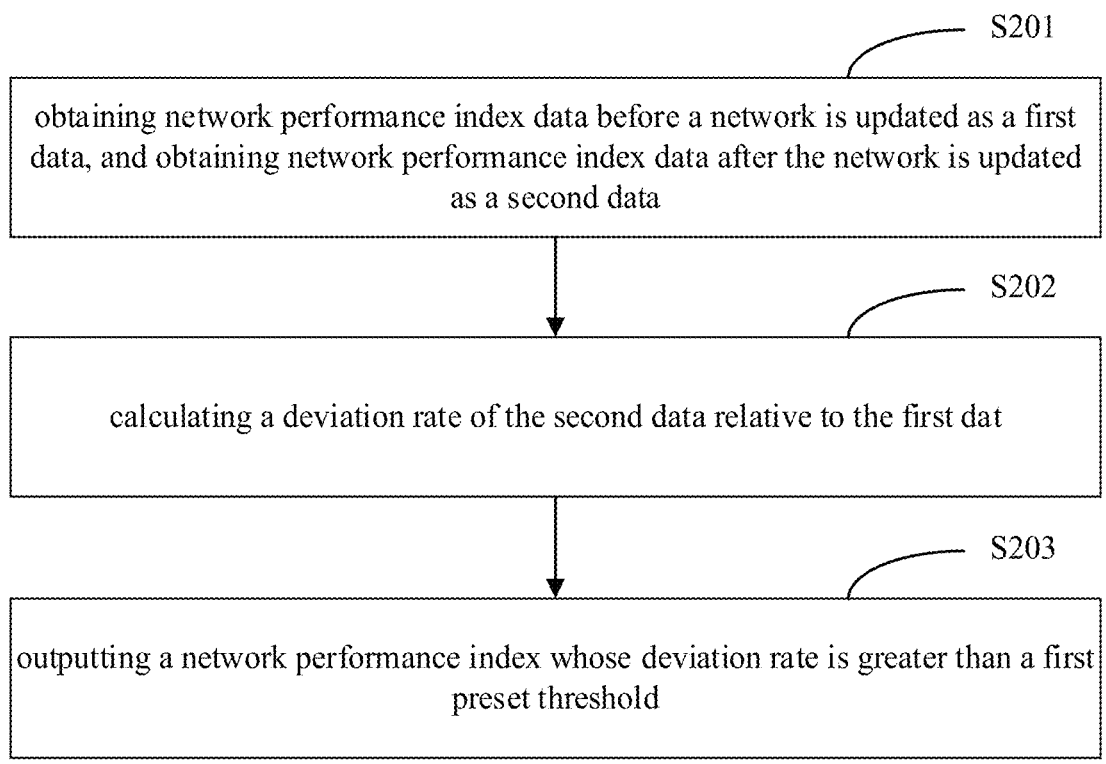
FIG. 3 is a schematic flowchart of a data analysis method according to a second embodiment of the present application.

The specific flow of the data analysis method provided in the embodiment of the present application is shown in FIG. 3, which specifically includes the following operations.

S201, obtaining network performance index data before a network is updated as a first data, and obtaining network performance index data after the network is updated as a second data;

S202, calculating a deviation rate of the second data relative to the first data; and S203, outputting a network performance index whose deviation rate is greater than a first preset threshold.

S201 is the same as S101 in the first embodiment. For details, refer to the description in the first embodiment. To avoid repetition, details are not repeated herein.

For S202 and S203, the deviation rate of the second data relative to the first data refers to the ratio of the larger number of samples in which the second data is greater or smaller than the first data to the total samples. For example, if the sampling granularity is 15 minutes, the data from 1 o'clock to 4 o'clock will be used as the second data after the network is updated, the second data has 12 samples. Before the network is updated, the average data in multiple days is used as the first data, and the first data also has 12 samples. If the number of samples of the second data greater than the first data is 9, and the number of samples of the second data smaller than the first data is 3. Since the number of samples of the second data greater than the first data is greater than the number of samples of the second data smaller than the first data, the deviation rate should be the ratio of the number of samples whose second data is greater than the first data to the total samples, i.e., =9/12-0.75. The comparison result of the second data being greater or smaller than the first data may be to compare samples at the same time. For example, the sample data of the second data at 1 o'clock is compared with the sample data of the first data at 1 o'clock, the sample data of the second data at 1:15 is compared with the sample data of the first data at 1:15 to increase the authenticity and credibility of the data comparison.

Since the deviation rate is the ratio of the larger number of samples in which the second data is greater or smaller than the first data to the total samples, when calculating the deviation rate, it is also possible to obtain information about whether the deviation rate is increasing or decreasing. For example, in the above example, the deviation rate of 0.75 is the ratio of the number of samples whose second data is greater than the first data to the total samples, so it can be obtained that the second data is increasing. When outputting the network performance index whose deviation rate is greater than the first preset threshold, information that the second data is increasing or decreasing may also be output.

The first preset threshold can be set according to the actual situation. A corresponding threshold parameter table may also be set, and an appropriate threshold is selected from the threshold parameter table as the first preset threshold as required, and then the data volatility is determined according to the first preset threshold. For example, if the first preset threshold is 0.8, and the calculation result of a certain network performance index is 0.75, which is less than the first preset threshold, indicating that the deviation rate of the network performance index is within a reasonable range, it can be considered that there has been no significant change, and no special attention is required. If another network performance index is 0.9, greater than the first preset threshold, indicating that the deviation rate of the network performance index is beyond the reasonable range, and it can be considered that there has been a significant change and special attention is required. Then, the network performance index is output, so that network operation and maintenance personnel can focus on the network performance index. If there are two or more network performance indexes whose deviation rate are greater than the first preset threshold, when the server outputs the network performance index whose deviation rate is greater than the first preset threshold, the server may also sort these network performance indexes, and output the sorted network performance index.

Since the second data may itself have relatively large volatility, if the deviation rate of the second data relative to the first data is calculated within a large time range, the deviation rate may fail to truly reflect the actual data volatility of the second data relative to the first data. For example, if the second data and the first data respectively have 10 sample data, the first 6 sample data of the second data are larger than the first data, and the last 4 sample data are smaller than the first data, the deviation rate=6/10=0.6, the deviation rate is not too large. However, if only the first 5 sample data of the second data and the first data are compared, the deviation rate is 5/5=1, which is far greater than the deviation rate of 0.6.

In order to more accurately calculate the deviation rate of the second data relative to the first data, in a specific example, calculating the deviation rate of the second data relative to the first data includes: calculating the deviation rate of the second data relative to the first data within a preset time window. The preset time window refers to the time range corresponding to the sample data of the first data and/or the second data, which can be set according to the actual situation, and is not limited herein. For example, 12 hours is selected as the preset time window, and the deviation rate of the second data relative to the first data in the 12-hour preset time window is investigated.

Embodiments of the present application provide a data analysis method, including: calculating a deviation rate of the second data relative to the first data; and outputting a network performance index whose deviation rate is greater than a first preset threshold. Since the deviation rate can effectively reflect the data volatility, calculating the deviation rate of the second data relative to the first data can effectively evaluate the data fluctuation of the second data relative to the first data, thereby effectively analyzing and evaluating the network performance after the network is updated.

A third embodiment of the present application relates to a data analysis method. The third embodiment is substantially the same as the second embodiment, the main difference is as follows. In this embodiment, before outputting the network performance index whose deviation rate is greater than the first preset threshold, the data analysis method further includes: calculating a significance test probability of the network performance index according to the first data and the second data; and outputting the network performance index whose deviation rate is greater than the first preset threshold includes: outputting the network performance index whose deviation rate is greater than the first preset threshold and whose significance test probability is less than a second preset threshold. Since the significance test probability can test the significant degree of the data volatility change of the second data relative to the first data, and the reliability and credibility of the deviation rate of the second data relative to the first data, Therefore, by using the first data and the second data to calculate the significance test probability of the network performance index, while evaluating the data volatility of the second data relative to the first data, the reliability and credibility of the deviation rate of the second data relative to the first data are checked, so as to output a more accurate network performance analysis result after the network update.

Figure 4:
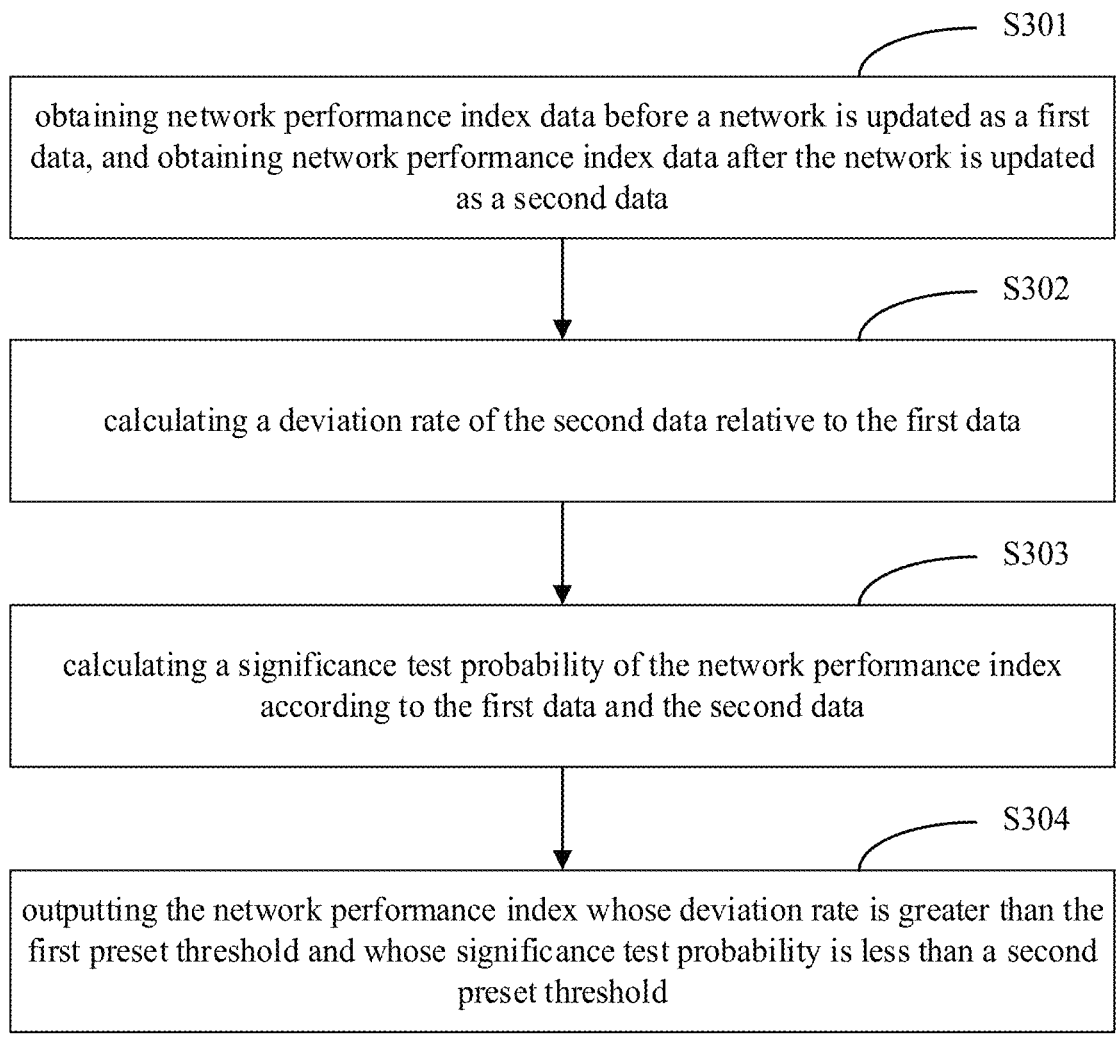
FIG. 4 is a schematic flowchart of a data analysis method according to a third embodiment of the present application.

The specific flow of the data analysis method provided in the embodiment of the present application is shown in FIG. 4, which specifically includes the following operations.

S301, obtaining network performance index data before a network is updated as a first data, and obtaining network performance index data after the network is updated as a second data.

S302, calculating a deviation rate of the second data relative to the first data.

S303, calculating a significance test probability of the network performance index according to the first data and the second data.

S304, outputting the network performance index whose deviation rate is greater than the first preset threshold and whose significance test probability is less than a second preset threshold.

S301 and S302 are the same as S201 and S202 in the second embodiment. For details, please refer to the description in the second embodiment. In order to avoid repetition, details are not repeated herein.

For S303 and S304, calculating the significance test probability of the network performance index according to the first data and the second data may be calculating the P value of the T test according to the first data and the second data, thereby calculating the significance test probability of the network performance index. Other methods for calculating the significance test may also be used, such as calculating the P value of the T2 test and the like.

The second preset threshold can be set according to actual needs, such as 0.05. If the calculated significance test probability is greater than 0.05, it indicates that the reliability and credibility of the result whose deviation rate is greater than the first preset threshold is not high. If the calculated significance test probability is less than 0.05, it indicates that the reliability and credibility of the result with the deviation rate greater than the first preset threshold is high, and it can be output as the network performance analysis result after the network update. Besides, when the significance test probability is smaller, it indicates that the change of the data volatility of the second data relative to the first data is more significant. It can be understood that since the significance test probability can reflect the significant degree of data volatility change, the data volatility of the second data relative to the first data can also be evaluated according to the significance test probability. When outputting the network performance analysis results, the significance test probability can be output together for further analysis. If the calculated significance test probability is greater than the second preset threshold, the sample data of the second data and/or the first data may be reselected, and the deviation rate of the second data relative to the first data and the corresponding significance test probability may be recalculated.

Figure 5:
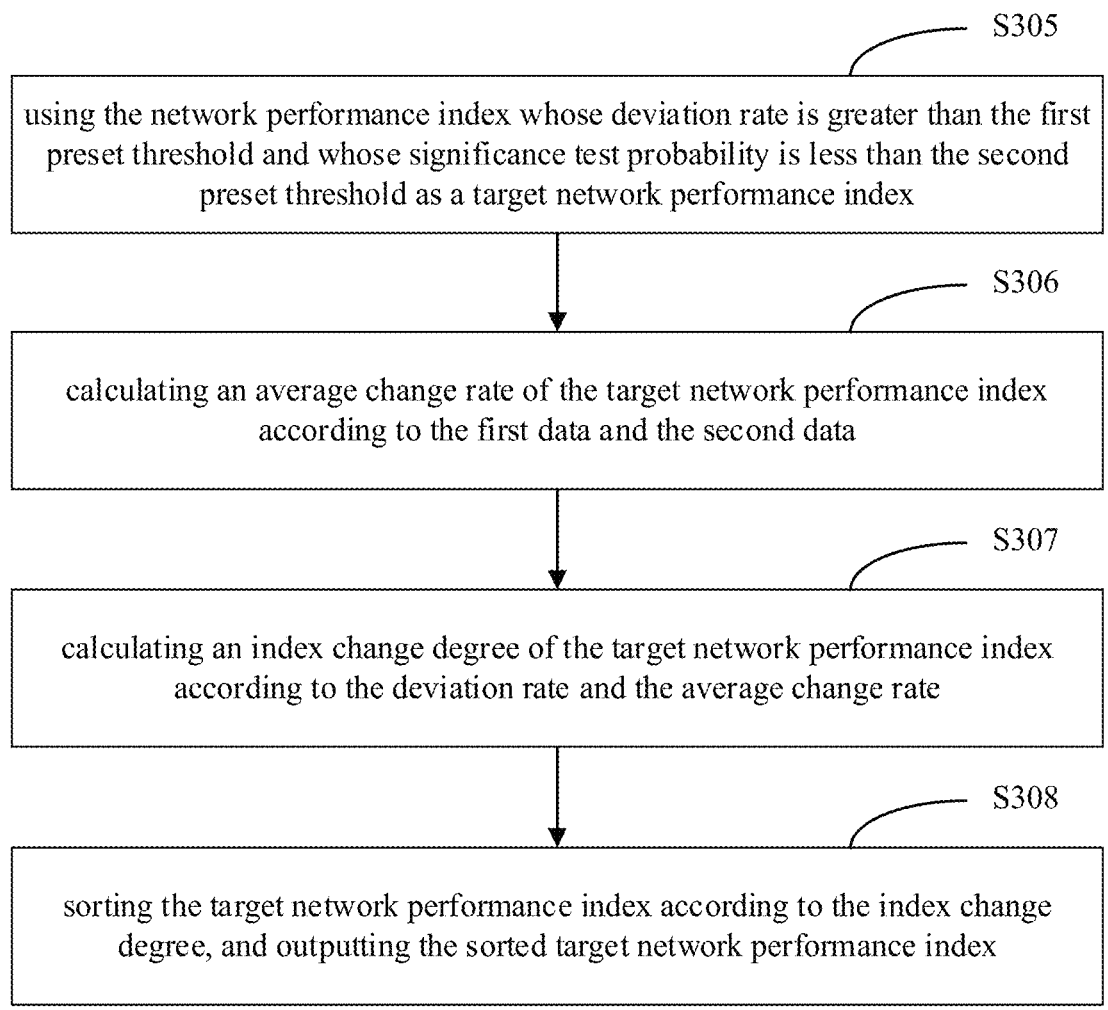
FIG. 5 is a schematic flowchart after operation S304 in a data analysis method according to a third embodiment of the present application.

In a specific example, after the outputting the network performance index whose deviation rate is greater than the first preset threshold and whose significance test probability is less than the second preset threshold, as shown in FIG. 5, the data analysis method further includes the following operations.

S305, using the network performance index whose deviation rate is greater than the first preset threshold and whose significance test probability is less than the second preset threshold as a target network performance index.

S306, calculating an average change rate of the target network performance index according to the first data and the second data.

S307, calculating an index change degree of the target network performance index according to the deviation rate and the average change rate.

S308, sorting the target network performance index according to the index change degree, and outputting the sorted target network performance index.

Calculating the average change rate of the target network performance index according to the first data and the second data can be calculating according to the following formula (1).

$$CR = 2*(\overline{data_{at}} - \overline{data_{bf}})/(\overline{data_{at}} + \overline{data_{bf}}) \quad (1)$$

CR is the average change rate of the target network performance index, $\overline{data_{at}}$ is the average value of the second data, and $\overline{data_{bf}}$ is the average value of the first data.

It should be noted that the formula (1) is only one of the calculation methods for calculating the average change rate, and the average change rate can also be calculated by other calculation methods, which are not specifically limited herein.

Calculating the index change degree of the target network performance index according to the deviation rate and the average change rate can be calculating according to the following formula (2).

$$DC = \text{diff\_ratio}^{a} * |CR|^{b} \quad (2)$$

DC is the index change degree of the target network performance index, diff_ratio is the deviation rate of the second data relative to the first data, CR is the average change rat, a is greater than 1, b is greater than 0 and less than 1. In an embodiment, a is equal to 4, and b is equal to 1/4.

It can be known from formula (2) that the index change degree is the weighted value of the deviation rate and the average change rate, and the deviation rate has a greater influence.

After calculating the index change degree, the server sorts the target network performance indexes according to the index change degree, and outputs the sorted target network performance indexes, which can enable network operation and maintenance personnel to quickly know the analysis results of network performance and select important network performance indexes to focus on, so as to realize further analysis of network performance after network update.

In a specific example, before outputting the sorted target network performance index, the data analysis method further includes: obtaining a sub-index of the target network performance index, and calculating the deviation rate of sub-index data after the network update relative to sub-index data before the network update, wherein the sub-index is a related index for calculating the target network performance index; the outputting the sorted target network performance index includes: outputting the sorted target network performance index and the sub-index whose deviation rate is greater than the first preset threshold.

The sub-index is, for example: if the target network performance index is Radio Access Bearer (RAB) establishment success rate, RAB establishment success rate=(CS domain RAB establishment success RAB number+PS domain RAB establishment success RAB number)/(CS domain RAB establishment request RAB number+PS domain RAB establishment request RAB number)*100%. Since during the process of calculating the RAB establishment success rate, four related indexes are used: the number of RABs successfully established by the CS domain RAB, the number of RABs successfully established by the PS domain RAB, the number of RABs requested by the CS domain RAB establishment, and the number of RABs requested by the PS domain RAB establishment. Therefore, these four related indexes can be used as sub-indexes of the RAB establishment success rate.

In an embodiment, the sub-index can be analyzed using related counters. For example, the target network performance index is KPI/PI, which can be associated with related counters according to the formula of KPI/PI to determine the sub-index. If the calculated deviation rate of the relevant counter is greater than the first preset threshold, it indicates that the relevant sub-index has volatility. Outputting the sub-index whose deviation rate is greater than the first preset threshold together with the sorted target network performance index can achieve the effect of correlation analysis and prompting of the network performance index.

Embodiments of the present application provide a data analysis method. The significance test probability can test the significant degree of the data volatility change of the second data relative to the first data, as well as the reliability and credibility of the deviation rate of the second data relative to the first data. Thus, the significance test probability of the network performance index is calculated by the first data and the second data, while assessing the data volatility of the second data relative to the first data, the reliability and credibility of the deviation rate of the second data relative to the first data can be checked. In this way, a more accurate network performance analysis result after the network update is output.

In addition, those skilled in the art can understand that, the division of the operations in the above methods is only for clarity of description, and can be combined into one operation or split into multiple operations during implementation, as long as they include the same logical relationship, they are all within the protection scope of the present application. Adding insignificant modifications to the algorithm or process or introducing insignificant designs without changing the core design of the algorithm and process are all within the protection scope of the present application.

Figure 6:
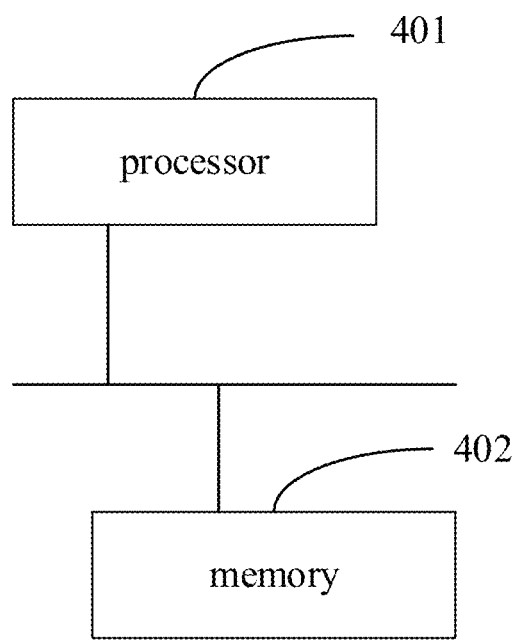
FIG. 6 is a schematic structural diagram of an electronic device according to a fourth embodiment of the present application.

A fourth embodiment of the present application relates to an electronic device. As shown in FIG. 6, the electronic device includes at least one processor 401 and a memory 402 communicated with the at least one processor 401. The memory 402 stores instructions executable by the at least one processor 401, when the instructions are executed by the at least one processor 401, the at least one processor 401 can perform the data analysis method as described above.

The memory and the processor are connected by a bus. The bus may include any number of interconnected buses and bridges that connect together the various circuits of one or more processors and memory. The bus may also connect together various other circuits, such as peripherals, voltage regulators, and power management circuits, which are well known in the art and therefore will not be described further herein. The bus interface provides the interface between the bus and the transceiver. A transceiver may be a single element or multiple elements, such as multiple receivers and transmitters, providing a means for communicating with various other devices over a transmission medium. The data processed by the processor is transmitted on the wireless medium through the antenna. In this embodiment, the antenna also receives the data and transmits the data to the processor.

The processor is responsible for managing the bus and general processing, and may also provide various functions including timing, peripheral interface, voltage regulation, power management, and other control functions. The memory may store data used by the processor when performing operations.

A fifth embodiment of the present application relates to a computer-readable storage medium storing a computer program. When the computer program is executed by the processor, the above method embodiment is realized.

Those skilled in the art can understand that all or part of the operations in the method of the above embodiments can be completed by instructing the relevant hardware through a program. The program is stored in a storage medium, and includes several instructions to cause a device (which may be a single-chip microcomputer, a chip, etc.) or a processor to execute all or part of the operations of the methods described in the various embodiments of the present application. The aforementioned storage medium includes: U disk, removable hard disk, read-only memory (ROM), random access memory (RAM), magnetic disk or optical disk and other media that can store program codes.

Those of ordinary skill in the art can understand that the above-mentioned embodiments are specific embodiments for realizing the present application. However, in practical application, various changes in form and details may be made therein without departing from the spirit and scope of the present application.

What is claimed is:

1. An automatic data analysis method, applied in a communication device, comprising:

obtaining network performance index data before a network is updated as a first data, and obtaining network performance index data after the network is updated as a second data; and outputting a network performance analysis result after the network is updated according to a data volatility of the second data relative to the first data, determining whether an update to the network is appropriate by evaluating the network performance analysis result, wherein the network performance analysis result includes network stability:

the outputting the network performance analysis result after the network is updated according to the data volatility of the second data relative to the first data comprises:

calculating a deviation rate of the second data relative to the first data; and outputting a network performance index whose deviation rate is greater than a first preset threshold, before the outputting the network performance index whose deviation rate is greater than the first preset threshold, the data analysis method further comprises:

calculating a significance test probability of the network performance index according to the first data and the second data;

the outputting the network performance index whose deviation rate is greater than the first preset threshold comprises:

outputting the network performance index whose deviation rate is greater than the first preset threshold and whose significance test probability is less than a second preset threshold, after the outputting the network performance index whose deviation rate is greater than the first preset threshold and whose significance test probability is less than the second preset threshold, the data analysis method further comprises:

using the network performance index whose deviation rate is greater than the first preset threshold and whose significance test probability is less than the second preset threshold as a target network performance index;

calculating an average change rate of the target network performance index according to the first data and the second data;

calculating an index change degree of the target network performance index according to the deviation rate and the average change rate; and sorting the target network performance index according to the index change degree, and outputting the sorted target network performance index.

2. The data analysis method of claim 1, wherein before the outputting the sorted target network performance index, the data analysis method further comprises:

obtaining a sub-index of the target network performance index, and calculating a deviation rate of sub-index data after the network update relative to sub-index data before the network update, wherein the sub-index is a related index for calculating the target network performance index;

the outputting the sorted target network performance index comprises:

outputting the sorted target network performance index and the sub-index whose deviation rate is greater than the first preset threshold.

3. The data analysis method of claim 1, wherein the calculating the index change degree of the target network performance index according to the deviation rate and the average change rate comprises:

calculating the index change degree according to a formula DC=diff_ratio CR b a * wherein DC is the index change degree, diff_ratio is a data deviation rate, CR is the average change rate, a is greater than 1, and b is greater than 0 and less than 1.

4. The data analysis method of claim 3, wherein CR is calculated according to a formula CR=2* $(\overline{data_{at}}-\overline{data_{bf}})/(\overline{data_{at}}+\overline{data_{bf}})$, data, is an average value of the second data, and $\overline{data_{bf}}$ is an average value of the first data.

5. An electronic device, comprising:
at least one processor; and
a memory communicated with the at least one processor, wherein the memory stores instructions executable by the at least one processor, and the instructions are executed by the at least one processor, to cause the at least one processor to execute the data analysis method of claim 1.

6. A non-transitory computer-readable storage medium, wherein a computer program is stored in the non-transitory computer-readable storage medium, and when the computer program is executed by a processor, the data analysis method of claim 1 is implemented.

* * * * *